Nov. 11, 1958 W. J. FAIRNINGTON 2,859,888
APPARATUS FOR STORING AND TRANSPORTING ARTICLES
Filed Jan. 19, 1956 2 Sheets-Sheet 1
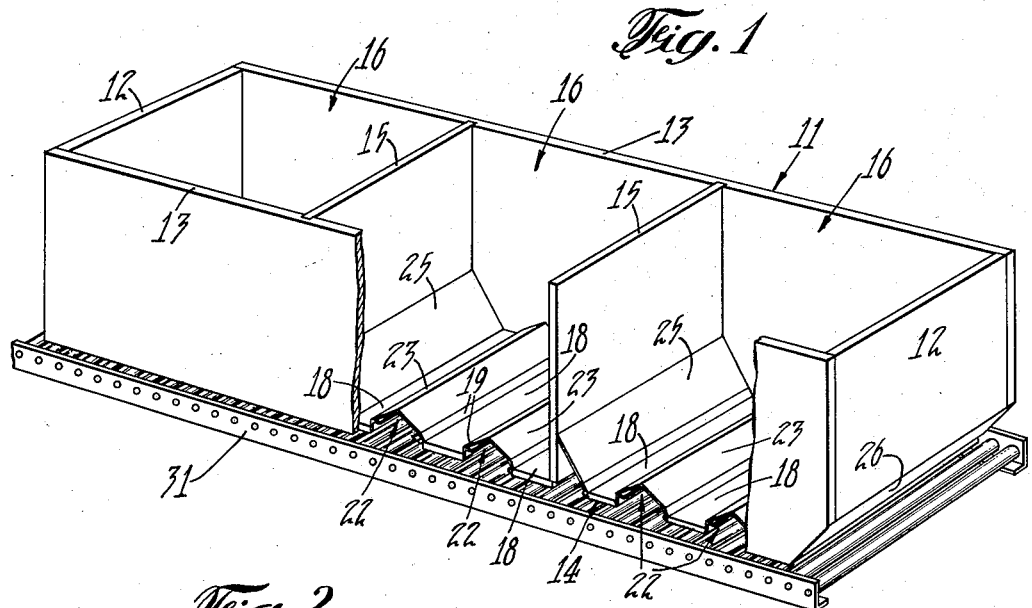
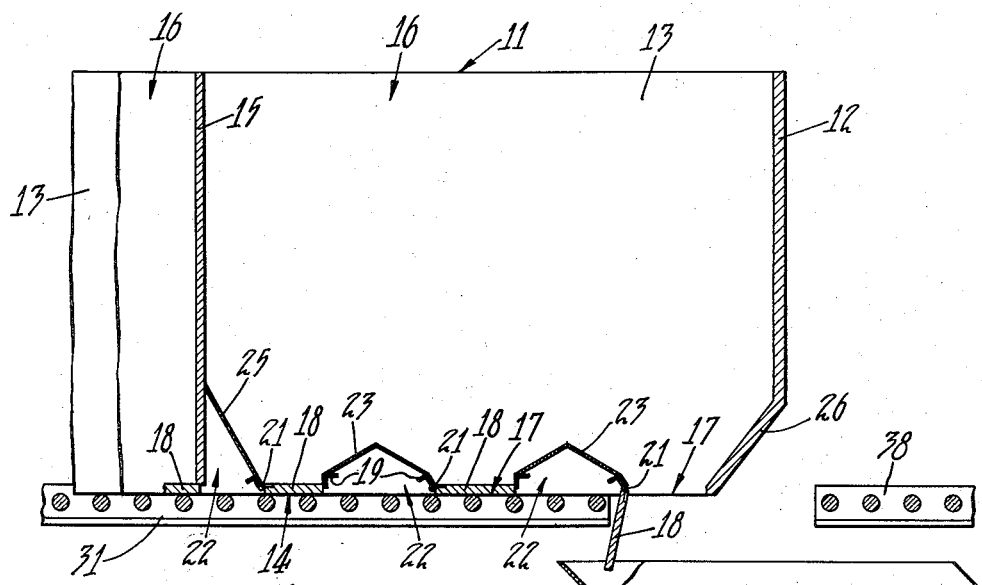
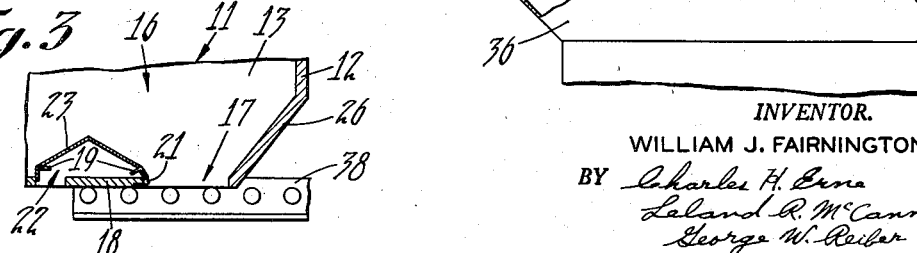
*INVENTOR.*
WILLIAM J. FAIRNINGTON
BY Charles H. Gene
Leland R. McCann
George W. Reiber
ATTORNEYS Nov. 11, 1958    W. J. FAIRNINGTON    2,859,888
APPARATUS FOR STORING AND TRANSPORTING ARTICLES
Filed Jan. 19, 1956    2 Sheets-Sheet 2

INVENTOR.
WILLIAM J. FAIRNINGTON
BY *Charles H. Erne*
*Leland R. McCann*
*George W. Reiber*
ATTORNEYS

United States Patent Office 2,859,888
Patented Nov. 11, 1958

2,859,888

APPARATUS FOR STORING AND TRANSPORTING ARTICLES

William J. Fairnington, Orlando, Fla., assignor to American Can Company, New York, N. Y., a corporation of New Jersey Application January 19, 1956, Serial No. 560,165

5 Claims. (Cl. 214—311)

The present invention relates to an apparatus for storing and transporting articles such as sheet metal containers and has particular reference to an improved carrier in which the articles are stored and transported and from which the articles may be readily delivered.

An object of the instant invention is the provision of an apparatus for storing and transporting sheet metal containers wherein the containers may be readily loaded into a movable carrier at a loading station of a container manufacturing plant or at a warehouse or other convenient source of supply of containers and after loading, moved into a trailer truck for transportation to a customer's plant and left at the customer's plant for unloading at his convenience without tieing up the truck while unloading.

Another object is the provision of such a carrier which is compartmented so as to provide for the loading of different kinds or sizes of containers into one carrier for one customer while keeping the different kinds of containers separated from one another.

Another object is the provision in such a carrier of a series of hinged unlocked doors disposed in the bottom of the carrier and held closed by the support on which the carrier rests and self opening by removal from the support so as to provide for automatic unloading of the containers from the compartments of the carrier upon relative movement between the carrier and its support.

Another object is the provision of such a carrier wherein the doors are hingeable through at least 180° and wherein recesses are provided in the bottom of the carrier to provide for hinging the doors out of the way upon opening so as to be clear and free of the bottom of the carrier upon transfer of the carrier from one support to another during unloading.

Another object is the provision of such a carrier which may be readily shifted from one support, such as a trailer truck or other conveyor, to another support without opening the doors in the bottom of the carrier so that the carrier may be delivered from one place to another without undesired automatic unloading of the containers.

Another object is the provision of such a carrier which keeps the load of containers away from conveyors and other supports on which the carrier rests during loading and transportation from one place to another so as to prevent injury to the load during these handling operations.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a carrier and its support embodying the apparatus of the instant invention, with portions of the carrier being broken away;

Fig. 2 is an enlarged longitudinal section of the forward portion of the carrier shown in Fig. 1 with supports and auxiliary supports in position for unloading the carrier;

Fig. 3 is a sectional detail of a portion of the carrier shown in Fig. 2 and illustrating the position of a fully opened door in the bottom of the carrier.

Figure 4:
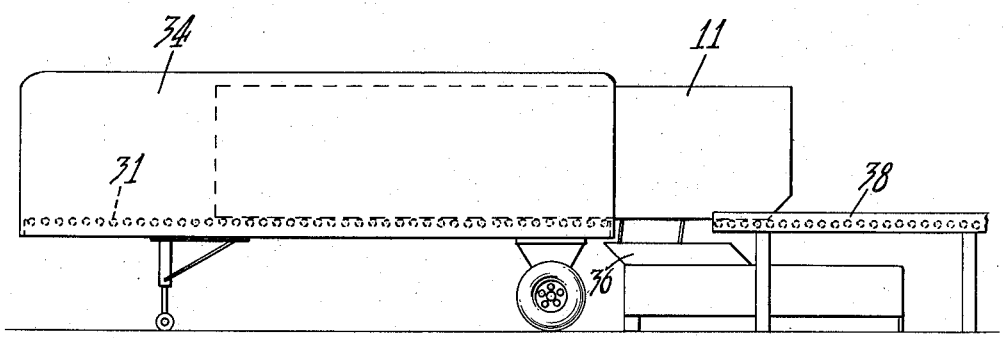
Fig. 4 is a schematic side elevation of a carrier being withdrawn from a trailer truck while delivering the load from the carrier.

As a preferred or exemplary embodiment of the instant invention the drawings illustrate an apparatus for storing and delivering sheet metal cans or containers in bulk form. Such an apparatus may be utilized for temporary storage in can manufacturing plants or for transportation from the manufacturing plant to the customer's plant.

The apparatus preferably comprises an open top box-like carrier 11 (Figs. 1, 2 and 6) having end walls 12, side walls 13 and a bottom 14. The interior of the carrier 11 preferably is provided with spaced upright partition walls 15 which set off compartments 16 to receive the load of containers. In such a compartmented carrier all of the compartments may be filled with the same kind or size of containers or each compartment may be filled with a different kind or size of container to be delivered to the same customer to keep the different kinds or sizes of containers separate, to facilitate subsequent handling of the containers. The compartments 16 may be loaded in any suitable manner.

Delivery of the containers from the carrier 11 is effected through the bottom of the carrier. For this purpose the bottom of each compartment of the carrier is provided with a plurality of spaced openings 17 normally closed by unlocked, hinged doors 18 which preferably extend transversely of the carrier for its full width. The doors 18 preferably are spaced apart a distance slightly greater than their own width and are framed by transverse angle irons 19 the ends of which are secured to the sides 13 of the carrier.

Each door 18 along one transverse edge is connected by hinges 21 to one of the angle irons 19 as best shown in Fig. 2. The hinges 21 are arranged to permit swinging of the doors outwardly and downwardly into an open position below the bottom of the carrier and thence upwardly if necessary through a total arc of at least 180° into a position in a recess 22 between the angle irons 19, as best shown in Fig. 3 where it is within the bottom of the carrier. Between the angle irons 19 the spaces or recesses 22 are bridged over by sheet metal, peaked deflectors or bottom members 23, which when the doors are open, deflect and direct the containers into the openings 17 and insure that all of the containers are delivered from the carrier. For this same purpose an inclined plate 25 is provided adjacent the partitions 15 and the forward end wall 12 of the carrier is formed with an inclined wall section 26.

Figure 6:
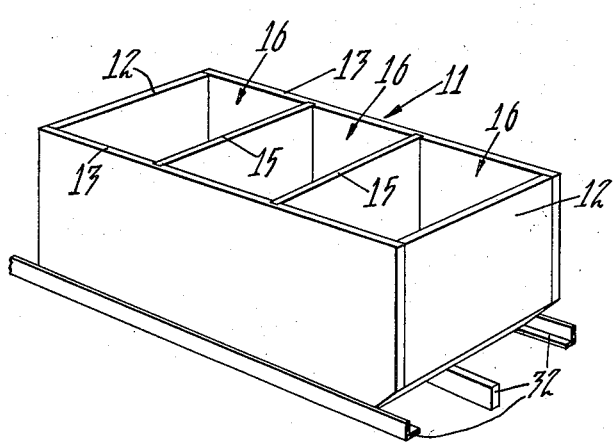
Fig. 6 is a perspective view of the carrier resting on a modified form of support for keeping the doors closed.

In order to keep the unlocked hinge doors 18 closed to retain the containers in the carrier 11 during loading, the carrier is supported on a suitable base. This base preferably is a conventional roller conveyor 31 (Figs. 1 and 2) which extends at least the length of the carrier or as shown in Fig. 6 may be longitudinal rails 32 of a slideway, track, or other support. In either case, the outer or lower face of the doors 18 are substantially flush with the bottom of the carrier and rest on the conveyor 31 or rails 32 and are thereby retained in a closed position.

When the carrier 11 is loaded, it may be shifted to any suitable place of storage, along continuations of the conveyor 31 or rails 32 provided to keep the hinge doors closed and to facilitate movement of the carrier. When the loaded carrier 11 is to be transported to a customer, it is shifted into a trailer truck 34 (Figs. 4 and 5) or other suitable conveyance having roller conveyors 31 or slide rails 32 to retain the doors 18 in closed position.

To unload the containers from the carrier 11, the carrier is advanced beyond a terminal end or break in the roller conveyor 31 or rails 32 as shown in Fig. 2. This may be effected by movement of the carrier or the conveyor. Such a movement removes the support from under the doors 18 and permits them to fall open as shown in Fig. 2. In practice, the carrier 11 preferably is moved beyond the conveyor 31 a distance just enough to permit the first door 18 to automatically open. The containers in the first compartment of the carrier, immediately above the first door thereupon tumble out through the first delivery opening 17. A receiving bin, chute, or other suitable device 36 (Fig. 2) usually is provided to receive the containers as they are delivered and to direct or carry them to a suitable place of deposit.

When the delivery of containers from the first opening 17 is exhausted or nearly exhausted, the carrier 11 is shifted sufficiently to remove the conveyor support from under the second door and to thus permit this door to open and deliver the containers immediately above it, into the receiving device 36. In this manner the doors 18 in the bottom of the carrier are permitted to automatically open in succession to deliver the full load of containers from the carrier.

As the carrier 11 is shifted beyond its supporting conveyor 31 or rails 32, the overhanging portion of the carrier preferably is resupported on an auxiliary roller conveyor or rail 38 (Fig. 2) provided for this purpose. This auxiliary conveyor 38 preferably is disposed in spaced relation to the support conveyor 31 so as to provide a break between the supports as shown in Fig. 2 to permit automatic opening of the doors 18 as they are brought into register with the break by the shifting of the carrier. In case such shifting is desired without unloading the articles in the compartments 16 or any of them or a particular one of them the space or break between conveyor 31 and auxiliary conveyor 38 is omitted.

As the carrier 11 rides onto and along the auxiliary conveyor 38, an open door 18 in the position shown in Fig. 2 is pushed back, further open, by contact with the auxiliary conveyor 38, until the door is hinged upwardly into the adjacent recess 22 in the bottom of the carrier as shown in Fig. 3. In this position, the inner face of the door 18 is now flush with the bottom of the carrier, and the door rides along freely on the auxiliary conveyor without injury to the door, the carrier or the conveyor.

When such a carrier 11 is transported to a customer's plant by trailer truck such as shown in Fig. 4, the truck is backed-up to the customer's delivery platform provided with an auxiliary support conveyor or rail 38 and the carrier 11 is shifted from the truck to the auxiliary support. If the containers are to be unloaded from the carrier 11 while the truck remains in position, a break is provided between the truck support conveyor 31 and the auxiliary support conveyor 38 so that the doors 18 will automatically open as the moving carrier registers them with the break. A receiving device 36 is provided in the break to receive and convey the delivered containers to any suitable place of deposit.

Figure 5:
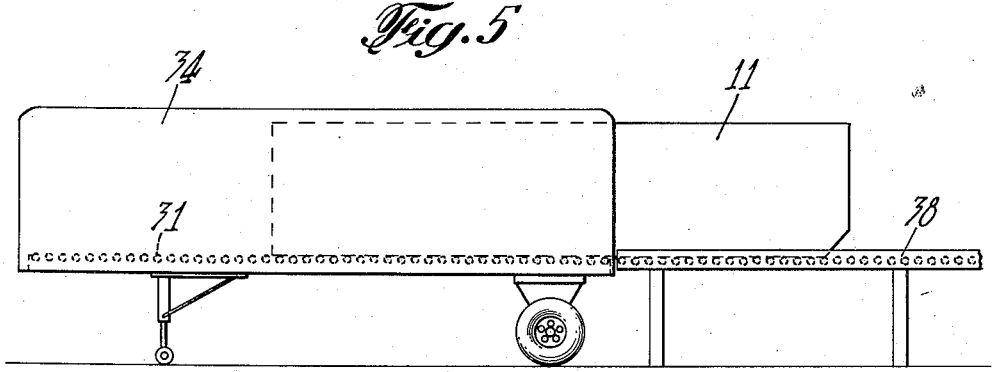
Fig. 5 is a view similar to Fig. 4 showing the carrier being removed from the trailer truck without automatic delivery of the load and support for subsequent delivery of the load after dismissal of the truck.

Preferably the carrier 11 is unloaded from the truck 34 without unloading the containers so that the truck may be taken away immediately for another load. In such a case, no break is provided between the truck support conveyor 31 and the auxiliary conveyor 38 as illustrated in Fig. 5. Hence the carrier 11 in being removed from the truck is immediately resupported on the auxiliary conveyor 38, and the doors 18 are thereby continuously supported and prevented from opening. The loaded carrier 11 may thus be held for subsequent unloading from the auxiliary support conveyor 38 at the convenience of the customer.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for storing and transporting articles such as sheet metal containers, comprising a substantially rectangular carrier having a bottom in part composed of spaced parallel transverse upstanding deflector members setting off therebetween a plurality of transverse discharge openings in the carrier, said upstanding deflector members each defining a recess closed at its upper end for housing a fully opened door, a plurality of doors respectively hinged at one side to the adjacent sides of said deflector members for closing said delivery openings, and a pair of longitudinally aligned spaced supports for said carrier, one of said supports holding said doors in horizontal closed position to prevent discharge of articles from the carrier, whereby relative longitudinal movement between said supports and said carrier progressively clears said doors from said one support to permit the doors to swing open by gravity to depending position to discharge articles from the carrier on opposite sides of said upstanding deflector members and between said supports, continuance of said relative movement serving to progressively dispose said carrier on the second of said longitudinally spaced supports to further successively swing said doors to fully open position through a complete arc of substantially 180° to dispose said fully opened doors within said door recesses defined by said deflector members.

2. Apparatus for storing and transporting articles such as sheet metal containers, comprising a substantially rectangular carrier having a bottom wall including spaced parallel upstanding deflector members extending transversely thereof and setting off therebetween a plurality of discharge openings, said upstanding deflector members each defining a closed recess for housing a door, a plurality of doors respectively hinged to said deflector members for closing said openings, and a pair of longitudinally aligned and spaced roller conveyors for supporting said carrier, the conveyor rollers extending transversely of the carrier and engageable with said doors to hold the same in closed position to prevent discharge of articles from the carrier, whereby relative longitudinal movement between one of said roller conveyors and said carrier progressively clears said doors from said rollers to permit the doors to swing open by gravity to depending position to discharge articles from the carrier on opposite sides of said upstanding deflector members and between said conveyors, continuance of said relative movement serving to progressively transfer said carrier on the second of said roller conveyors so that the rollers of the latter will successively engage and swing said doors upwardly to fully open position through an arc of substantially 180° to dispose said doors within said recesses of said deflector members.

3. Apparatus for storing and transporting articles such as sheet metal containers as defined in claim 1, wherein one of said supports is fixed on a truck so as to be movable into spaced alignment with the other support which is also fixed to produce a spaced continuation of said truck support, whereby to permit transfer of the carrier from said truck to said other fixed support while permitting discharge of articles through said discharge openings and between said supports as the doors are swung by gravity into depending open position.

4. Apparatus for storing and transporting articles such as sheet metal containers as defined in claim 2, wherein one of said roller conveyors is fixed on a truck so as to be movable into non-spaced alignment with the other roller conveyor which is also fixed to produce a continuous roller conveyor for transfer of the carrier from said truck to said other conveyor without permitting said doors to open and discharge articles from said carrier through said discharge openings for subsequent delivery of said articles by longitudinal movement of said carrier on said other fixed roller conveyor.

5. Apparatus for storing and transporting articles such as sheet metal containers as defined in claim 2, wherein one of said roller conveyors is fixed on a truck so as to be movable into spaced alignment with the other conveyor which is also fixed to produce a spaced continuation of said truck conveyor for transfer of the carrier from said truck to said other fixed conveyor while permitting discharge of articles from the carrier through said discharge openings and between said conveyors as the doors are swung by gravity into depending open position from engagement with the rollers of said truck conveyor.

References Cited in the file of this patent
UNITED STATES PATENTS

| | | |
|---|---|---|
| 572,023 | McDonough | Nov. 24, 1896 |
| 1,020,665 | Sherman et al. | Mar. 19, 1912 |
| 2,597,387 | Seidel et al. | May 20, 1952 |